(12) United States Patent
Arai et al.

(10) Patent No.: US 11,461,037 B2
(45) Date of Patent: Oct. 4, 2022

(54) DATA COLLECTION SYSTEM AND DATA COLLECTION METHOD

(71) Applicant: Yokogawa Electric Corporation, Tokyo (JP)

(72) Inventors: Takashi Arai, Tokyo (JP); Yusaku Yoshida, Tokyo (JP); Shuichi Sato, Tokyo (JP); Hiroo Urabe, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 615 days.

(21) Appl. No.: 16/502,130

(22) Filed: Jul. 3, 2019

(65) Prior Publication Data

US 2020/0012448 A1 Jan. 9, 2020

(30) Foreign Application Priority Data

Jul. 9, 2018 (JP) .............................. JP2018-129852

(51) Int. Cl.
*G06F 11/07* (2006.01)
*G06F 3/06* (2006.01)
*H04L 67/1097* (2022.01)
*H04L 67/125* (2022.01)

(52) U.S. Cl.
CPC .......... *G06F 3/0653* (2013.01); *G06F 3/0604* (2013.01); *G06F 3/0659* (2013.01); *G06F 3/0683* (2013.01); *G06F 11/0751* (2013.01); *G06F 11/0787* (2013.01); *H04L 67/1097* (2013.01); *H04L 67/125* (2013.01)

(58) Field of Classification Search
CPC .. G06F 11/07; G06F 11/0751; G06F 11/0787; G06F 3/0653; G06F 3/0604; G06F 3/0659; G06F 3/0683
See application file for complete search history.

(56) References Cited

U.S. PATENT DOCUMENTS

| | | | |
|---|---|---|---|
| 7,653,840 B1 * | 1/2010 | Taylor .................. | G11C 29/765 714/47.2 |
| 7,657,796 B1 * | 2/2010 | Kaiser ................. | G06F 11/1435 714/764 |
| 10,405,411 B2 * | 9/2019 | Veskovic ............. | H05B 47/185 |

(Continued)

FOREIGN PATENT DOCUMENTS

| JP | 2013-218532 A | 10/2013 |
|---|---|---|
| JP | 2015-154445 A | 8/2015 |

*Primary Examiner* — Kamini B Patel
(74) *Attorney, Agent, or Firm* — Sughrue Mion, PLLC (57) ABSTRACT

A data collection system including a device having a communication function and a data collection apparatus configured to collect data transmitted from the device. The data collection apparatus includes a receiver configured to receive data transmitted from the device, a data analyzer configured to acquire analyzed data by analyzing the received data according to analysis data format different for each device, a first data storage which is a non-rewritable storage, a second data storage which is storage that can be accessed faster than the first data storage and that stores a smaller amount of data than the first data storage, a data writer configured to writes and stores the data received by the receiver to the first data storage, and writes and stores the analyzed data acquired by the data analyzer to the second data storage.

20 Claims, 7 Drawing Sheets (56) References Cited

U.S. PATENT DOCUMENTS

| | | | |
|---|---|---|---|
| 2004/0199814 A1* | 10/2004 | Kim | H04L 1/1819 |
| | | | 714/18 |
| 2005/0007845 A1 | 1/2005 | Angerer et al. | |
| 2005/0008072 A1 | 1/2005 | Angerer et al. | |
| 2008/0183952 A1* | 7/2008 | Rikitake | G06F 11/1076 |
| | | | 711/E12.008 |
| 2008/0220720 A1* | 9/2008 | Ashley | G01S 5/0009 |
| | | | 340/539.11 |
| 2011/0246827 A1* | 10/2011 | Lin | G06F 11/22 |
| | | | 714/E11.159 |
| 2011/0289454 A1* | 11/2011 | Houllier | G06F 16/29 |
| | | | 715/810 |
| 2012/0287118 A1* | 11/2012 | Mizutani | A63F 13/92 |
| | | | 345/643 |
| 2013/0024734 A1* | 1/2013 | Katsuragi | G06F 3/0689 |
| | | | 714/E11.003 |
| 2013/0267164 A1* | 10/2013 | Kodama | H04W 12/084 |
| | | | 455/7 |
| 2014/0150010 A1* | 5/2014 | Jeon | H04N 21/6106 |
| | | | 725/60 |
| 2015/0236903 A1* | 8/2015 | Kodama | H04L 41/0806 |
| | | | 370/254 |
| 2017/0222999 A1* | 8/2017 | Banga | H04L 63/10 |
| 2017/0262508 A1 | 9/2017 | Garcia | |
| 2017/0344592 A1* | 11/2017 | Sundaram | G06F 16/273 |
| 2018/0242437 A1* | 8/2018 | Veskovic | H05B 45/10 |
| 2019/0297085 A1* | 9/2019 | De Wijs | H04L 63/102 |
| 2020/0036793 A1* | 1/2020 | Arai | G05B 19/0423 |
| 2020/0174942 A1* | 6/2020 | Jung | G06F 12/0862 |
| 2020/0257530 A1* | 8/2020 | Lee | G11C 11/4093 |

* cited by examiner

| | | | | | | LATEST DATA |
|---|---|---|---|---|---|---|
| BUILDING A | RAINWATER TANK A | DATA COLLECTION APPARATUS | WAN | GW | LAN | SENSOR | 2017/10/10 12:00:00 |
| | RAINWATER TANK B | DATA COLLECTION APPARATUS | WAN | GW | LAN | SENSOR | 2017/8/10 9:00:00 |
| BUILDING B | RAINWATER TANK C | DATA COLLECTION APPARATUS | WAN | GW | LAN | SENSOR | 2017/10/10 12:00:00 |
| | RAINWATER TANK D | DATA COLLECTION APPARATUS | WAN | GW | LAN | SENSOR | 2017/10/10 12:00:00 |
| | RAINWATER TANK E | DATA COLLECTION APPARATUS | WAN | GW | LAN | SENSOR | 2017/10/10 12:00:00 |
| | RAINWATER TANK F | DATA COLLECTION APPARATUS | WAN | GW | LAN | SENSOR | 2017/10/10 12:00:00 |
| | RAINWATER TANK G | DATA COLLECTION APPARATUS | WAN | GW | LAN | SENSOR | 2017/10/10 12:00:00 |
| | RAINWATER TANK H | DATA COLLECTION APPARATUS | WAN | GW | LAN | SENSOR | 2017/10/10 12:00:00 |

MALFUNCTION ●    WARNING ●

DATA COLLECTION SYSTEM AND DATA COLLECTION METHOD

BACKGROUND OF THE INVENTION

Field of the Invention

The present invention relates to a data collection system and a data collection method.

The present application claims priority based on Japanese Patent Application No. 2018-129852, filed on Jul. 9, 2018, the content of which is incorporated herein by reference.

Description of Related Art

In recent years, IoT (Internet Of Things) or IIoT (Industrial Internet Of Things) has attracted attention. IoT or IIoT is a technique for connecting any and all things (hardware terminals in general such as sensors, devices, and devices) to the Internet, collecting data of things acquired by sensors to a server in the cloud, analyze the collected data on the server, and use (feedback) the analysis results for a specific purpose.

Japanese Patent Laid-Open No. 2013-218532 and Japanese Patent Laid-Open No. 2015-154445 disclose a technique of a wireless communication system in which a plurality of field devices (measuring devices and controllers) capable of wireless communication called wireless field devices are disposed in facilities in a plant, and each of the plurality of wireless field devices communicates control signals, measurement signals, and the like by a wireless network. In the wireless communication system disclosed in Japanese Patent Laid-Open No. 2013-218532 and Japanese Patent Laid-Open No. 2015-154445, each wireless field device is connected with a relay apparatus called a gateway for relaying data. In the wireless communication system disclosed in Japanese Patent Laid-Open No. 2013-218532 and Japanese Patent Laid-Open No. 2015-154445, the gateway performs communication with a host management apparatus by a wired network.

As a result, the wireless communication system technology disclosed in Japanese Patent Laid-Open No. 2013-218532 and Japanese Patent Laid-Open No. 2015-154445 can achieve an IIoT-compliant plant in which a plurality of field devices installed in respective facilities in the plant are configured to output (send) a measurement value representing a physical quantity detected by a sensor to the host management apparatus via the gateway.

By the way, in data-intensive web applications used in the traditional IoT system, vendor-specific applications are emerging. Also, servers on the cloud need to store a large amount of data in order to collect data from each device equipped with IoT function. In such a case, there is a problem in that the processing speed is reduced due to the increase in the amount of data. For example, when the amount of data increases, the access speed on the server decreases, and as a result, the display speed on the user side also decreases.

In view of the above circumstances, it is an object of the present invention to provide a technique capable of suppressing a decrease in the processing speed due to an increase in the amount of data.

SUMMARY OF THE INVENTION

A data collection system according to an aspect of the present invention includes a device having a communication function and a data collection apparatus configured to collect data transmitted from the device. The data collection apparatus includes a receiver configured to receive data transmitted from the device, a data analyzer configured to acquire analyzed data by analyzing the received data according to analysis data format different for each device, a first data storage which is a non-rewritable storage, a second data storage which is storage that can be accessed at a higher speed than the first data storage and that stores a smaller amount of data than the first data storage, a data writer configured to writes and stores the data received by the receiver to the first data storage, and writes and stores the analyzed data acquired by the data analyzer to the second data storage.

Further features and aspects of the present disclosure will become apparent from the following detailed description of exemplary embodiment with reference to the attached drawings.

DETAILED DESCRIPTION OF THE INVENTION

An embodiment of the present invention will be described with reference to the preferred embodiment. A person skilled in the art can achieve many alternatives to the present embodiment using the teachings of the present invention, and the present invention is not limited to the preferred embodiment described herein.

Figure 1:
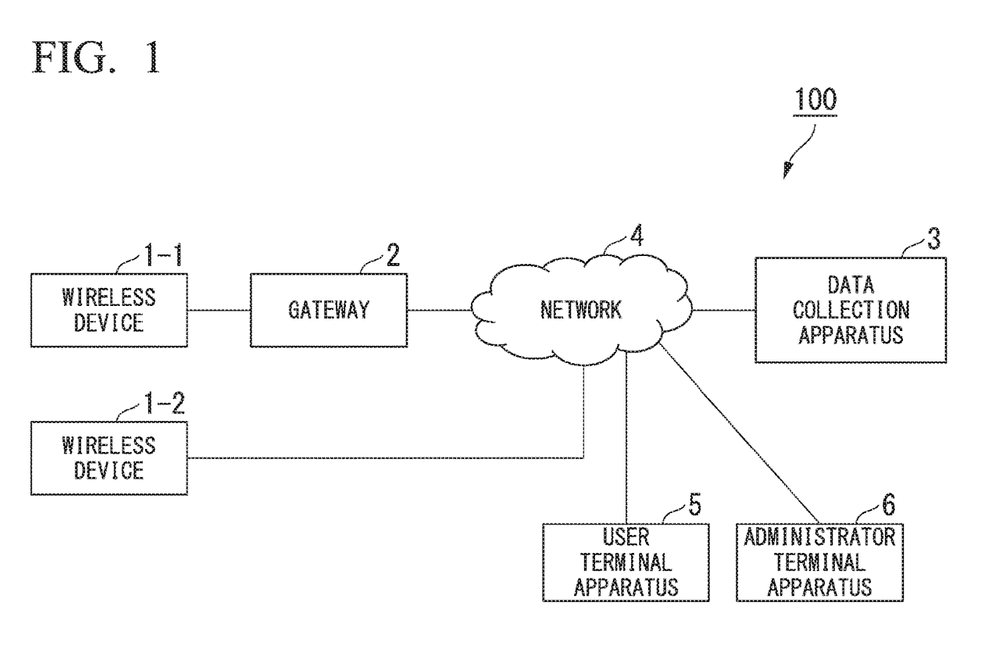
FIG. 1 is a block diagram illustrating an entire configuration of a data collection system according to the present invention.

FIG. 1 is a block diagram illustrating an entire configuration of a data collection system 100 according to the present invention. The data collection system 100 includes a wireless device 1, a gateway 2, and a data collection apparatus 3. Although FIG. 1 illustrates a wireless device 1-1 and a wireless device 1-2 as the wireless device 1, the number of the wireless devices 1 is not particularly limited. The wireless device 1-1 is connected to the data collection apparatus 3 via the gateway 2 and the network 4. Also, the wireless device 1-2 is connected to the data collection apparatus 3 via a network 4. The network 4 is, for example, the Internet. In the following description, the wireless device 1-1 and the wireless device 1-2 will be described as the wireless device 1 unless otherwise specified.

The wireless device 1 is a field device that is installed at a site such as a plant or a factory and performs measurements, operations, and the like necessary for process control. For example, the wireless device 1 may be a sensor such as a flow meter or a temperature sensor, a valve device such as a flow control valve or an on-off valve, an actuator device such as a fan or a motor, or a field device installed in other sites such as a plant or factory. The wireless device 1 performs a power saving operation (for example, an intermittent operation) using a battery as a power supply. For example, if the wireless device 1 is a sensor device, the wireless device 1 periodically transmits sensor data (e.g., temperature, humidity, flow rate, etc.) to the data collection apparatus 3. The wireless device 1 also transmits information such as battery temperature information, voltage value, and error information to the data collection apparatus 3.

In addition, the wireless device 1 performs communication by a low power wide area (LPWA) system.

The feature of the LPWA wireless communication system is to realize low power consumption and long distance communication (for example, several kilometers). On the other hand, in the LPWA wireless communication system, the communication speed (the amount of information to be communicated per unit time) is relatively low. In the LPWA wireless communication system, communication is performed using a sub-gigahertz band wireless signal. The wireless device 1 can use LoRaWAN as one of the standards for realizing the LPWA wireless communication system. The communication distance according to the LoRaWAN standard is up to about 20 km (km). However, the communication distance may be reduced to several kilometers depending on the output power at the time of transmission. Also, the amount of data transmission in LoRaWAN is, for example, about several dozen bytes per communication. The LPWA wireless communication system is an example of first communication.

The wireless device 1 may perform communication in a wireless communication using a narrow band Long Term Evolution (LTE) standard instead of the above-mentioned LoRaWAN. The narrow band LTE standard is, for example, standards such as LTE Cat.0, LTE Cat.M1 and LTE Cat. NB1 (NB-IoT). These standards use a narrower frequency band and a lower communication speed than the LTE standard used for smartphones and the like. More specifically, the frequency band used for the narrow band LTE communication is, for example, 200 kHz or less. Furthermore, as an example, the NB-IoT uses a frequency band of 180 kHz. In other words, these standards are LTE standards for IoT. Thus, the wireless device 1 is a wireless device having the IoT function.

In the example shown in FIG. 1, the wireless device 1-1 communicates with the gateway 2 by LoRaWAN. Also, the wireless device 1-2 communicates with the data collection apparatus 3 by LTE.

The gateway 2 is a device that connects the wireless device 1 and the data collection apparatus 3 via the network 4 and relays various data transmitted and received between the wireless device 11 and the data collection apparatus 3. The gateway 2 measures temperature, humidity, voltage, battery temperature, RSSI (Received Signal Strength Indication), and transmits measurement data to the data collection apparatus 3 when the gateway 2 itself can perform data measurement. The measurement data transmitted by the gateway 2 to the data collection apparatus 3 is an example of third data. The gateway 2 also transmits error information to the data collection apparatus 3. The gateway 2 communicates with the wireless device 1 by first communication. The gateway 2 communicates with the data collection apparatus 3 according to second communication. The second communication may be, for example, wired network communication using a terminal adapter or Ethernet (registered trademark) communication device, wireless communication using wireless network adapters such as WiFi adapters, or 3G/LTE cellular communication. The gateway 2 is an example of a relay apparatus.

The data collection apparatus 3 receives data transmitted from the wireless device 1 or the gateway 2. The data collection apparatus 3 includes a plurality of storages and storing data (hereinafter referred to as "received data") received from the wireless device 1 or the gateway 2 in each of the plurality of storages.

The plurality of storages include a first data storage and a second data storage. The first data storage stores the received data in a data format of the received data without changing the data format. That is, the first data storage stores the received data (raw data) as it is. The received data is an example of first data.

The second data storage stores the received data in a data format changed from the data format of the received data. That is, the second data storage stores data in a high readability state obtained by performing some processing on the received data. Data in a high readability state is data in which data transmitted from the wireless device 1 or the gateway 2 is analyzed to adjust its data format. More specifically, the data format of data to be transmitted differs according to the device type such as the type of the wireless device 1 or the type of the gateway 2.

The data collection apparatus 3 analyzes data of different data formats as described above according to the data format for analysis (hereinafter referred to as "analysis format") predetermined for each device type as described above. The analysis format contains, for each device type, information indicating what kind of information is stored at which position of the data format. Therefore, when the wireless device 1 is a flow meter, the data collection apparatus 3 refers to the analysis format to identify the portion where the flow value is stored from the data transmitted from the flow meter, and analyze the flow value from the values contained in the identified portion.

The data stored in the second data storage is frequently accessed data. Frequently accessed data is data for the latest predetermined period (for example, one week) collected in the data collection apparatus 3. The data which was collected in a certain time in the past is not suitable for grasping the current state of the wireless device 1 and the gateway 2. On the other hand, since the latest data is relatively new data, it is suitable for grasping the current state of the wireless device 1 and the gateway 2. Such latest data is frequently accessed. Therefore, the data collection apparatus 3 stores all the received data that has been collected in first data storage as it is received, and converts data for the most recent predetermined period (for example, one week) into data in a high readability state and stores the data in the high readability state into the second data storage.

Also, the data collection apparatus 3 provides information to requesters in response to requests from user terminal apparatus 5 and administrator terminal apparatus 6.

The user terminal apparatus 5 is a communication apparatus operated by a customer using the data collection system 100. The user terminal apparatus 5 is configured using, for example, an information processing apparatus such as a smartphone, a mobile phone, a tablet terminal, a notebook computer, a personal computer, and a game device. The user terminal apparatus 5 is an example of terminal apparatus.

The administrator terminal apparatus 6 is a communication apparatus operated by a person (e.g., an administrator) of the data collection system 100. The administrator terminal apparatus 6 is configured using, for example, an information processing apparatus such as a smartphone, a mobile phone, a tablet terminal, a notebook computer, a personal computer, and a game device. The administrator terminal apparatus 6 is an example of terminal apparatus.

Figure 2:
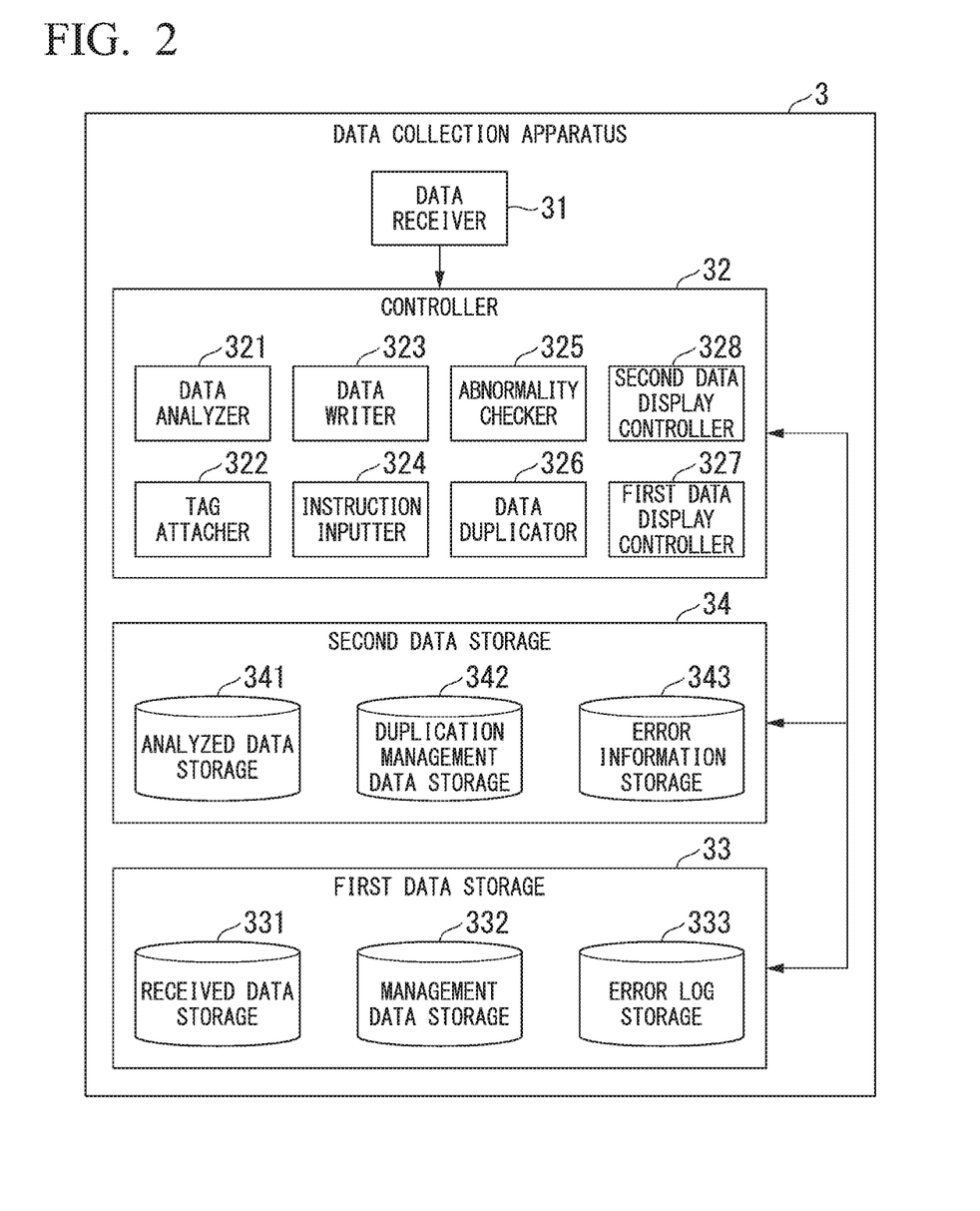
FIG. 2 is a schematic block diagram illustrating a functional configuration of the data collection apparatus.

FIG. 2 is a schematic block diagram illustrating a functional configuration of the data collection apparatus 3. The data collection apparatus 3 includes a data receiver 31, a controller 32, a first data storage 33, and a second data storage 34.

The data receiver 31 is an interface that communicates with the wireless device 1 or the gateway 2. The data receiver 31 receives data transmitted from the wireless device 1 or the gateway 2. The data received by the receiver 31 is digital data.

The controller 32 is constituted using a processor such as a CPU (Central Processing Unit). By executing a program, the controller 32 functions as a data analyzer 321, a tag attacher 322, a data writer 323, an instruction inputter 324, an abnormality checker 325, a data duplicator 326, a first data display controller 327, and a second data display controller 328. The program executed by the controller 32 may be recorded on a computer-readable recording medium. The computer-readable recording medium is, for example, a portable medium such as a flexible disk, a magneto-optical disk, a ROM, a CD-ROM, or a storage device such as a hard disk built in a computer system. Programs may also be sent and received via telecommunication lines. The program may be constituted by JAVA (registered trademark).

The data analyzer 321 acquires analyzed data by analyzing received data according to analysis format. The analysis format is stored in the first data storage 33 and the second data storage 34. The data analyzer 321 acquires post-analysis data by analyzing the received data according to the analysis format stored in the second data storage 34. The analyzed data is data in a high readability state, for example, data acquired by converting values of sensor data such as temperature and humidity into numerical values with predetermined units representing physical quantities and adjusting its data format. The analyzed data is an example of second data.

The tag attacher 322 attaches a tag to received data and analyzed data. A tag is the identification information associated with an installation location of a hardware apparatus. The hardware apparatus is, for example, the wireless device 1, the gateway 2, the data collection apparatus 3, and so on. By attaching a tag to received data, it is possible to facilitate retrieval of received data for devices of the same installation location even for received data of different data formats.

The data writer 323 writes the data with the tag attached thereto to the first data storage 33 and the second data storage 34. More specifically, the data writer 323 stores the received data with the tag attached thereto by writing the received data to the first data storage 33. Also, the data writer 323 stores the analyzed data with the tag attached thereto by writing the analyzed data to the second data storage 34.

The instruction inputter 324 inputs an instruction from the user terminal apparatus 5 or the administrator terminal apparatus 6.

Specifically, the instruction inputter 324 inputs an instruction of providing information from user terminal apparatus 5 or administrator terminal apparatus 6. The instruction inputter 324 outputs the input instruction to the first data display controller 327 or the second data display controller 328.

The abnormality checker 325 checks abnormality in the data collection system 100 based on error information for a predetermined time stored in the second data storage 34. Specifically, the abnormality checker 325 checks abnormality of a network line between the devices in the data collection system 100 and abnormality of the wireless device 1 or the gateway 2. The abnormality checker 325 stores the check result of the abnormality to the first data storage 33.

The data duplicator 326 duplicates a part of data stored in the first data storage 33 to the second data storage 34 when a condition of duplication timing is satisfied. The condition of duplication timing may be timing when data collection apparatus 3 is activated or timing when data is newly added to the first data storage 33.

The first data display controller 327 generates a screen data for providing information based on the data stored in the first data storage 33 or the second data storage 34 according to a request output from the instruction inputter 324, and provides the screen data to the requester. The screen data for providing information is, for example, screen data for maintenance and screen data for maintenance and inspection.

The second data display controller 328 generates a screen data for providing information based on the data stored in the first data storage 33 or the second data storage 34 according to a request output from the instruction inputter 324, and provides the screen data to the requester. The screen data for providing information is, for example, screen data for maintenance and screen data for maintenance and inspection.

The first data storage 33 includes a received data storage 331, a management data storage 332, and an error log storage 333. The first data storage 33 is implemented as, for example, a write once table, in which data cannot be rewritten, of a database stored in a recording medium having a lower access speed but a larger storage capacity than a main memory. The first data storage 33 is constituted by, for example, an SSD (Solid State Drive), a disk storage such as a hard disk, a non-volatile recording medium such as a flash ROM (Read Only Memory) or an EEPROM (Electrically Erasable and Programmable ROM).

The received data storage 331 stores received data received by the data receiver 31. More specifically, the received data storage 331 stores digital data received by the data receiver 31.

Figure 3:
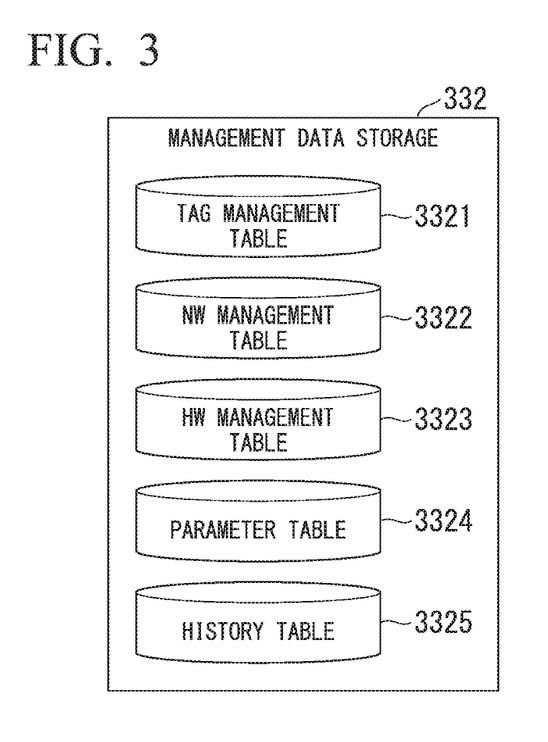
FIG. 3 is a diagram illustrating a specific example of a table stored by a management data storage.

The management data storage 332 stores a plurality of tables for managing the data collection system 100. The management data storage 332 stores, as illustrated in FIG. 3, a tag management table 3321, an NW management table 3322, an HW management table 3323, a parameter table 3324, and a history table 3325. FIG. 3 is a diagram illustrating a specific example of a table stored by the management data storage 332.

The tag management table 3321 is a table in which information for managing tags is registered. In the tag management table 3321, a tag ID and a tag name are registered in association with each other. The tag ID represents identification information for identifying a tag. The tag name represents the name of a tag. For example, the tag name is the installation location of a device or the name of a device.

The NW management table 3322 is a table in which information about a connection relationship between a tag and a tag is registered. In the NW management table 3322, a connection tag name and information indicating a communication direction between the connection tag names are registered in association with each other. The connection tag name represents a tag name in a connection relationship in the data collection system 100. For example, when a tag name "water level gauge" and a tag name "GW" are in a connection relationship, the tag name "water level gauge" and the tag name "GW" are registered in the connection tag name. Information indicating the direction of communication between connection tag names is information indicating whether communication is unidirectional or bidirectional between connection tag names. For example, when, between the tag name "water level gauge" and the tag name "GW", communication is performed from the tag name "water level gauge" to the tag name "GW", information representing one direction from the tag name "water level gauge" to the tag name "GW" is registered.

The HW management table 3323 is a table in which information about each device provided in the data collection system 100 is registered. In the HW management table 3323, an identification ID, a name, address information, a tag ID, an analysis format, and an abnormality determination condition of each device are registered in association with one another. The identification ID of the device represents the identification information of the hardware apparatus. The name represents the name of the hardware apparatus. The address information represents the address information about the hardware apparatus, such as a MAC address or an IP address. The tag ID represents identification information for identifying the tag.

The analysis format represents the data format used for analysis of received data, which is set for each type of device. The analysis format is, for example, a format in which the first four bytes of received data from a certain wireless device 1 are defined as information about temperature. Thus, the data analyzer 321 can analyze the received data. The abnormality determination condition is a condition for determining an abnormality in the data collection system 100. The abnormality determination conditions include a first abnormality determination condition for determining malfunctions and a second abnormality determination condition for determining warnings as abnormality. The abnormality determination condition is set as appropriate.

The parameter table 3324 is a table in which information about various parameters set for each device in the data collection system 100 is registered.

The history table 3325 is a table for saving information at the time of change such as addition of data registered in one of the tables stored in the management data storage 332.

The history table 3325 registers the date and time when the change was made, the table to be changed, and the change content in association with each other.

The error log storage 333 stores the abnormality check result by the abnormality checker 325. The abnormality check result includes a first abnormality check result corresponding to the first abnormality determination condition and a second abnormality check result corresponding to the second abnormality determination condition.

The second data storage 34 includes an analyzed data storage 341, a duplication management data storage 342, and an error information storage 343. The second data storage 34 is implemented as, for example, an in-memory table stored in a main memory such as a random access memory (RAM) having a faster access speed but a smaller storage capacity than an SSD or a hard disk.

The analyzed data storage 341 stores the analyzed data. The analyzed data storage 341 stores a smaller number of analyzed data than the number of received data stored in the received data storage 331. For example, the analyzed data storage 341 stores analyzed data for a predetermined period (for example, one week). Thus, the data stored in the analyzed data storage 341 is data that is analyzed to improve readability as compared to the received data, and the number of data stored in the analyzed data storage 341 is smaller than the number of data stored in the received data storage 331.

The duplication management data storage 342 stores data similar to the management data storage 332. Specifically, the duplication management data storage 342 stores tag a management table 3321, an NW management table 3322, an HW management table 3323, a parameter table 3324, and a history table 3325. Each table stored in the duplication management data storage 342 is a table which the data duplicator 326 makes by duplicating each table stored in the management data storage 332. That is, the duplication management data storage 342 stores the same data as those in the management data storage 332.

The error information storage 343 stores the error information acquired by the data analyzer 321. Specifically, the error information storage 343 includes a tag ID, a date and time, and an error content stored in association with each other.

Figure 4:
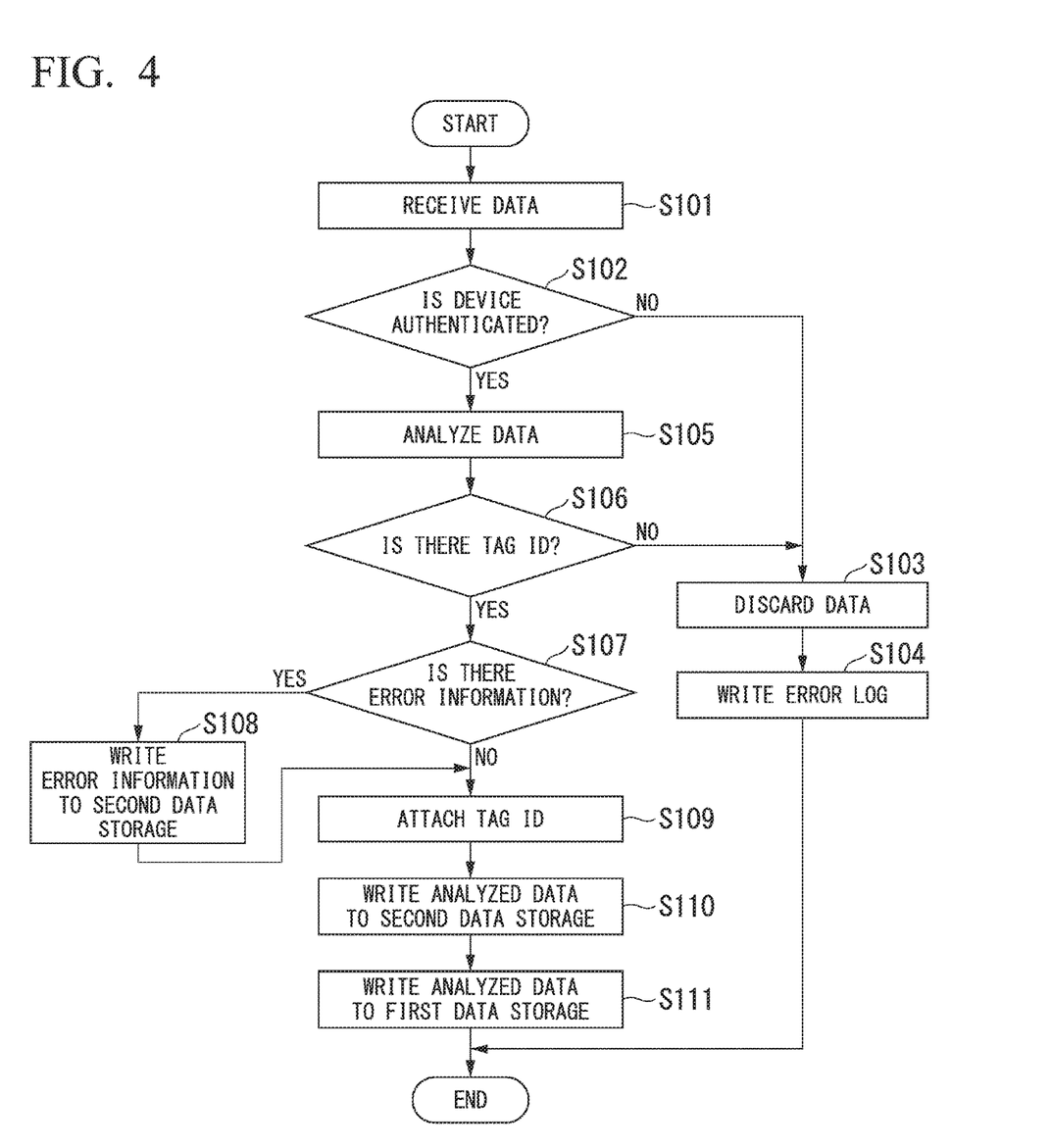
FIG. 4 is a flowchart illustrating a flow of data write processing which a data collection apparatus performs.

FIG. 4 is a flowchart illustrating a flow of data write processing which the data collection apparatus 3 performs.

The data receiver 31 receives data transmitted from the wireless device 1 directly or via the gateway 2 (step S101). When the gateway 2 measures data, the data receiver 31 receives data transmitted from the gateway 2. The data receiver 31 outputs the received data to the controller 32. The data analyzer 321 authenticates the device (e.g., wireless device 1) that is the transmission source of the received data based on the duplication management data storage 342 of the second data storage 34 (step S102). Specifically, the data analyzer 321 determines that the source device has been authenticated when the source device of the received data is registered in the HW management table 3323 stored in the duplication management data storage 342. On the other hand, the data analyzer 321 determines that the source device has not been authenticated when the source device of the received data is not registered in the HW management table 3323 stored in the duplication management data storage 342.

When the source device has not been authenticated (step S102—NO), the data analyzer 321 discards the received data (step S103). Thereafter, the data writer 323 writes to the error log storage 333 an error log that the received data has been discarded (step S104). Thereafter, the processing of FIG. 4 is terminated.

On the other hand, when the source device has been authenticated (step S102—YES), the data analyzer 321 analyzes the received data (step S105). Specifically, first, the data analyzer 321 acquires address information of the device (for example, the wireless device 1) that is the transmission source of the received data. Also, the data analyzer 321 refers to the acquired HW management table 3323 stored in the management data storage 332, and acquires an analysis format associated with the acquired address information. Also, the data analyzer 321 acquires analyzed data by analyzing received data according to the acquired analysis format. In addition, the data analyzer 321 determines whether or not the received data includes error information, and when the error data is included, the data analyzer 321 acquires the error information. Also, the data analyzer 321 acquires the tag ID associated with the acquired address information from the HW management table 3323 stored in the duplication management data storage 342.

The data analyzer 321 determines whether there is a tag ID associated with the address information (step S106). When there is no tag ID associated with the address information (step S106—NO), the data collection apparatus 3 executes the processing of step S103 and subsequent steps.

On the other hand, when there is a tag ID associated with the address information (step S106—YES), the data analyzer 321 determines whether error information has been acquired from the received data (step S107).

When the error information is acquired from the received data (step S107—YES), the data analyzer 321 outputs the error information and the tag ID to the data writer 323. The data writer 323 stores, in the error information storage 343, the error information output from the data analyzer 321 and the tag ID in association with each other (step S108). When the error information is not acquired from received data (step S107—NO), or after the process of step S108, the tag attacher 322 assigns a tag ID to the received data and the analyzed data acquired in the process of step S105 (Step S109).

The tag attacher 322 outputs the analyzed data and the received data having the tag attached thereto to the data writer 323, respectively. The data writer 323 writes the analyzed data having the tag attached thereto, which is output from the tag attacher 322, to the analyzed data storage 341 (step S110). At this time, when the storage amount of the analyzed data storage 341 is already full, the data writer 323 deletes the most recent analyzed data stored in the analyzed data storage 341 and writes new analyzed data. In addition, the data writer 323 writes the received data having the tag attached thereto, which is output from the tag attacher 322, to the received data storage 331 (step S111).

Note that when a write error occurs during the process of step S110 or in the process of step S111, the data writer 323 writes a tag ID, a date and time, and a content indicating that a write error has occurred to the error information storage 343.

Figure 5:
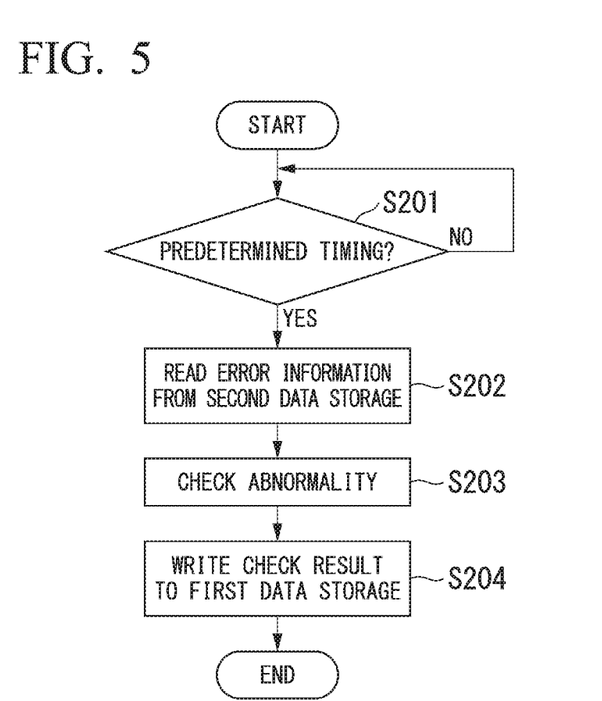
FIG. 5 is a flowchart illustrating a flow of process of abnormality check performed by the data collection apparatus.

FIG. 5 is a flowchart illustrating a flow of process of abnormality check performed by the data collection apparatus 3.

The abnormality checker 325 determines whether or not a predetermined timing has come (step S201). The predetermined timing may be a preset time or a timing at which an external instruction is given. When the predetermined timing has not come (step S201—NO), the abnormality checker 325 waits until the predetermined timing comes.

On the other hand, when the predetermined timing has come (step S201—YES), the error information is read out from the error information storage 343 (step S202).

The abnormality checker 325 checks the abnormality based on the read error information and the abnormality determination condition of the HW management table 3323 stored in the duplication management data storage 342 (step S203). Specifically, when there is error information that satisfies the abnormality determination condition, the abnormality checker 325 determines that it is either a warning or a malfunction. The abnormality checker 325 outputs the abnormality check result to the data writer 323. The data writer 323 stores the abnormality check result output from the abnormality checker 325 in the error log storage 333 (step S204).

Figure 6:
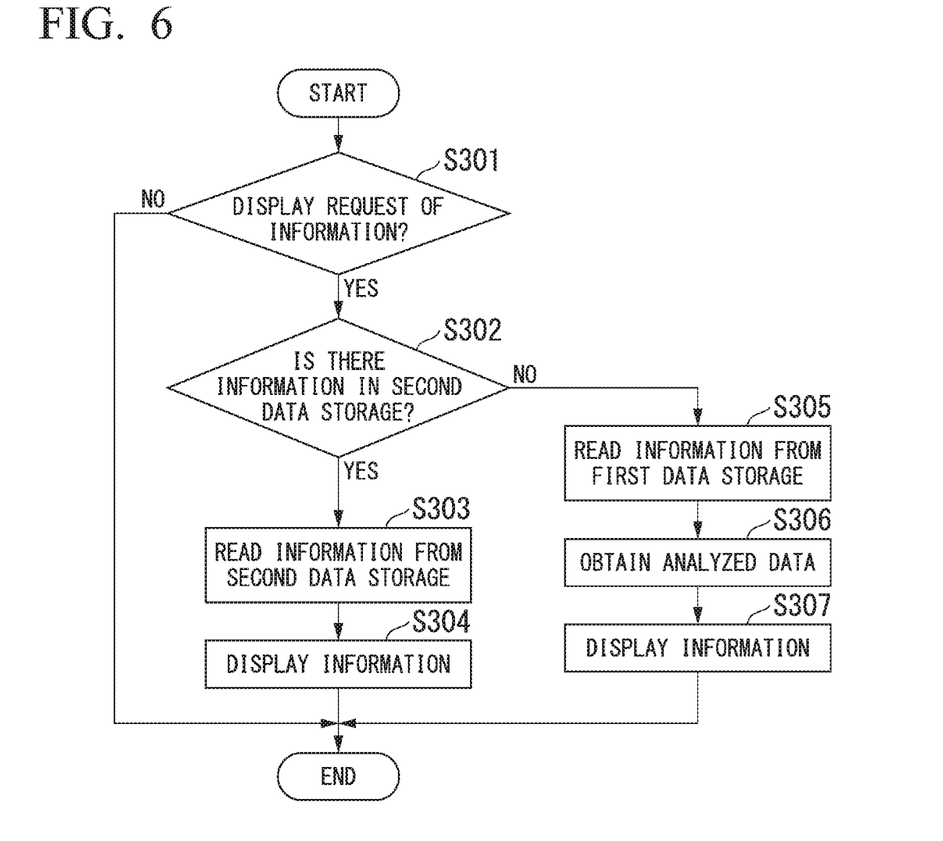
FIG. 6 is a flowchart illustrating a flow of information display process performed by the data collection apparatus.

FIG. 6 is a flowchart illustrating a flow of information display process performed by the data collection apparatus 3.

The first data display controller 327 or the second data display controller 328 determines whether a display request for information has been made from an external device (for example, the user terminal apparatus 5 or the administrator terminal apparatus 6) (step S301). When the display request for information is not given (step S301—NO), the data collection apparatus 3 terminates the processing of FIG. 6.

On the other hand, when a display request for information is given (step S301—YES), the second data display controller 328 refers to the second data storage 34 and determines whether there is requested information (step S302). The second data storage 34 stores only data of a predetermined period (for example, one week). Therefore, when an external device requests to provide information for a period longer than or equal to a predetermined period (for example, information for two weeks or information for one month ago), the second data display controller 328 cannot provide the requested information with only the information stored in the second data storage 34. Therefore, when the external device requests to provide information for a period longer than or equal to a predetermined period, the second data display controller 328 determines that the requested information is not present.

On the other hand, when an external device requests to provide information within a predetermined period, the second data display controller 328 determines that the requested information is present. When there is requested information (step S302—YES), the second data display controller 328 reads information necessary for providing the requested information from the second data storage 34 (step S303). Then, the second data display controller 328 generates screen data for provision based on the read information, and transmit the generated screen data to the device of the request source to display the information (step S304). Thereafter, the data collection apparatus 3 terminates the processing of FIG. 6.

On the other hand, when there is no requested information (step S302—NO), the first data display controller 327 reads out information necessary for providing the requested information from the first data storage 33 (step S305). The received data stored in the first data storage 33 is data as received by the data receiver 31. That is, the data format of the received data stored in the first data storage 33 is not in order. Therefore, the first data display controller 327 searches the received data storage 331 for information necessary to provide the requested information based on the tag ID. Then, the first data display controller 327 acquires analyzed data by causing the data analyzer 321 to analyze the acquired received data (step S306).

Then, the first data display controller 327 generates screen data for provision based on analyzed data and other information stored in the first data storage 33, and transmits the generated screen data to the device of the request source to display the information (step S307). Thereafter, the data collection apparatus 3 terminates the processing of FIG. 6.

Figure 7:
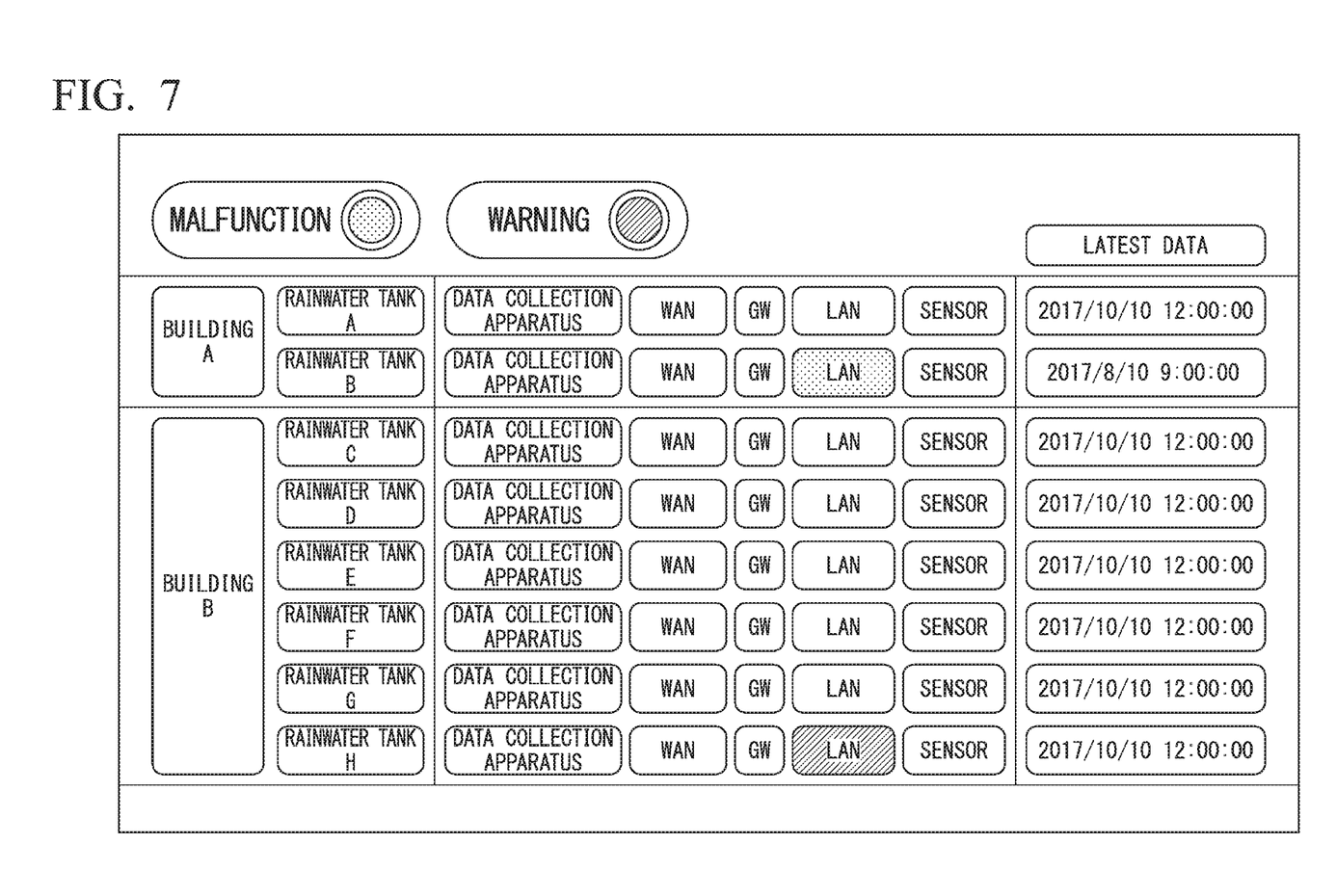
FIG. 7 is a figure illustrating an example of a maintenance screen displayed on a user terminal apparatus.

FIG. 7 is a figure illustrating an example of a maintenance screen displayed on the user terminal apparatus 5.

As illustrated in FIG. 7, the maintenance screen displays, for each device installed in a building such as a plant or factory, information indicating an abnormality and information at the latest date and time when data was received from the device. The information indicating the abnormality indicates which device or which part of the network the abnormality has occurred. The example illustrated in FIG. 7 shows an example in which the data collection apparatus 3, a WAN line, a GW, a LAN line, and a sensor are connected from upstream to downstream, and which of them has an abnormality is displayed in a status different from other statuses.

For example, FIG. 7 illustrates that a malfunction has occurred in the LAN line for "RAINWATER TANK A" of "BUILDING A". Also, for example, FIG. 7 illustrates that a warning occurred in the LAN line in "RAINWATER TANK B" of "BUILDING B". The determination of these abnormalities is performed by the abnormality checker 325. Then, the first data display controller 327 or the second data display controller 328 acquires the result of the abnormality determination by referring to the error log storage 333 and generates screen data reflecting the acquired result of the abnormality determination.

According to the data collection system 100 configured as described above, the data collection apparatus 3 stores frequently-accessed data for the latest predetermined period in the second data storage 34 implemented as an in-memory table, in such a state that its readability is improved, and stores data as received in the first data storage 33, i.e., an auxiliary storage device. As a result, the second data storage 34 stores a smaller amount of data than the first data storage 33, and stores the data in such a state that the data is easy to provide.

The in-memory table means a table of a database stored in a storage device having a high access speed such as a main memory of a computer, as compared with a conventional table stored in an auxiliary storage device such as an SSD or a hard disk of a computer. The in-memory table of database achieves high-speed and stable data access, and can provide information at high speed. Therefore, the in-memory table of database can suppress a decrease in the processing speed due to an increase in the amount of data.

In the received data storage 331 of the first data storage 33, the received data is stored as it is received. Therefore, it is easier to solve problems by tracing data during maintenance.

<Modification>

The first data display controller 327 and the second data display controller 328 may be configured as one display controller.

The data collection system 100 may be provided with a field device having a wired communication function instead of the wireless device 1 (1-1 and 1-2), or may be provided with both of a wireless device 1 and a field having a wired communication function.

As mentioned above, although the embodiment of the present invention has been described in detail with reference to the drawings, the specific configuration is not limited to the embodiment, and includes the designs and the like within the scope of the present invention.

As used herein, the following directional terms "front, back, above, downward, right, left, vertical, horizontal, below, transverse, row and column" as well as any other similar directional terms refer to those instructions of a device equipped with the present invention. Accordingly, these terms, as utilized to describe the present invention should be interpreted relative to a device equipped with the present invention.

The term "configured" is used to describe a component, unit or part of a device includes hardware and/or software that is constructed and/or programmed to carry out the desired function.

Moreover, terms that are expressed as "means-plus function" in the claims should include any structure that can be utilized to carry out the function of that part of the present invention.

The term "unit" is used to describe a component, unit or part of a hardware and/or software that is constructed and/or programmed to carry out the desired function. Typical examples of the hardware may include, but are not limited to, a device and a circuit.

While preferred embodiment of the present invention has been described and illustrated above, it should be understood that these are examples of the present invention and are not to be considered as limiting. Additions, omissions, substitutions, and other modifications can be made without departing from the scope of the present invention. Accordingly, the present invention is not to be considered as being limited by the foregoing description, and is only limited by the scope of the claims.

The invention claimed is:

1. A data collection system comprising a plurality of devices having a communication function and a data collection apparatus configured to collect data transmitted from the plurality of devices,
the data collection apparatus comprising:
a receiver configured to receive data transmitted from the plurality of devices;
a data analyzer configured to acquire analyzed data by analyzing the received data according to an analysis data format which is different for each device of the plurality of devices, the analysis data format being predetermined for each type of device of the plurality of devices;
a first data storage which is a non-rewritable storage;
a second data storage which is storage that can be accessed faster than the first data storage and that stores a smaller amount of data than the first data storage; and
a data writer configured to write and store the data received by the receiver with a tag attached thereto to the first data storage, and write and store the analyzed data acquired by the data analyzer with the tag attached thereto to the second data storage, the tag being identification information associated with an installation location of the device from which the data is received.

2. The data collection system according to claim 1, wherein the first data storage is implemented as a write-once table, in which data is non-rewritable, of a database.

3. The data collection system according to claim 1, wherein the second data storage is implemented as an in-memory database stored in a main memory of the data collection apparatus.

4. The data collection system according to claim 1, wherein the data collection apparatus further comprises a tag attacher configured to attach the tag, and
the data writer stores, to the first data storage, the tag and the data associated with each other.

5. The data collection system according to claim 1, wherein the data collection apparatus further comprises a tag attacher configured to attach the tag, and
the data writer stores, to the second data storage, the tag and the analyzed data associated with each other.

6. The data collection system according to claim 1, wherein when a free space of the second data storage is insufficient and the analyzed data cannot be stored in the second data storage, the data writer deletes oldest data in the second data storage and writes the analyzed data acquired by the data analyzer to the second data storage.

7. The data collection system according to claim 1, wherein the data analyzer determines whether the data includes error information by analyzing the data, and
the data writer stores error information in the second data storage when the data includes error information,
the data collection apparatus further comprises:
an abnormality checker configured to check an abnormality in the data collection system based on the error information stored in the second data storage for a predetermined time, to generate an abnormality check result; and the abnormality checker stores the abnormality check result in the first data storage.

8. The data collection system according to claim 7, wherein the error information includes the tag, a date and time, and an error content, and
the abnormality checker checks an abnormality in the data collection system based on the error information for a predetermined time stored in the second data storage and an abnormality determination condition stored in the second data storage.

9. The data collection system according to claim 7, wherein the abnormality determination condition includes a first abnormality determination condition and a second abnormality determination condition,
the abnormality check result includes a first abnormality check result corresponding to the first abnormality determination condition and a second abnormality check result corresponding to the second abnormality determination condition,
when the error information for the predetermined time stored in the second data storage satisfies the first abnormality determination condition, the abnormality checker stores the first abnormality check result in the first data storage, and
when the error information for the predetermined time stored in the second data storage satisfies the second abnormality determination condition, the abnormality checker stores the second abnormality check result in the first data storage.

10. The data collection system according to claim 9, wherein the first abnormality check determination condition is an abnormality determination condition for determining a malfunction of the device or a malfunction related to communication between the device and the data collection apparatus, and
the second abnormality determination condition is an abnormality determination condition for determining a warning of the device or a warning related to communication between the device and the data collection apparatus.

11. The data collection system according to claim 9, wherein when the data stored in the second data storage cannot provide the requested information, the display controller searches, with the tag, the data required for providing the requested information from the first data storage.

12. The data collection system according to claim 7, further comprising:
a terminal apparatus configured to receive an input from a user and transmit a request to the data collection apparatus,
wherein the data collection apparatus comprises a display controller configured to, in response to the request from the terminal apparatus, acquire the abnormality check result stored in the first data storage, generate screen data for providing information based on the abnormality check result, and provide the generated screen data to the terminal apparatus.

13. The data collection system according to claim 1, further comprising:
a terminal apparatus configured to receive an input from a user and transmit a request for information to the data collection apparatus,
wherein the data collection apparatus comprises a display controller configured to, in response to the request from the terminal apparatus, generate, based on the request for information, screen data for providing the information based on the data stored in the first data storage or the second data storage, and provide the generated screen data to the terminal apparatus, and
when the request from the terminal apparatus is received, the display controller generates the screen data by preferentially using data stored in the second data storage rather than data stored in the first data storage.

14. The data collection system according to claim 13, wherein when data stored in the second data storage cannot provide the requested information, the display controller reads the data required for providing the requested information from the first data storage and causes the data analyzer to analyze the read data to generate analyzed data, and thereafter, the display controller generates the screen data using the analyzed data.

15. The data collection system according to claim 1, wherein the data collection apparatus further includes a data duplicator configured to duplicate some of data stored in the first data storage to the second data storage, when the data collection apparatus is started or when new data is added to the first data storage.

16. The data collection system according to claim 1, wherein the each of the plurality of devices measures a physical quantity, and transmits a measurement result acquired in the measurement to the data collection apparatus as first data,
the receiver receives the first data transmitted from the plurality of devices,
the data analyzer analyzes the received first data according to a first data format, which is a format of the first data, to generate second data described according to a second data format in which the physical quantity is described as a numerical value with a predetermined unit,
the data writer writes and stores the first data in the first data storage, and
the data writer writes and stores the second data in the second data storage.

17. The data collection system according to claim 16, further comprising a relay apparatus configured to receive the first data by a first communication, and transmit the first data to the data collection apparatus by a second communication which is different from the first communication,
wherein the device transmits the first data to the relay apparatus by the first communication,
the receiver receives the first data transmitted from the relay apparatus, and
the data analyzer analyzes the received first data according to the first data format to generate the second data.

18. The data collection system according to claim 17, wherein the relay apparatus measures a physical quantity, and transmits a measurement result acquired in the measurement of the relay apparatus to the data collection apparatus as third data by the second communication,
the receiver receives the third data transmitted from the relay apparatus, and
the data analyzer analyzes the received third data according to a third data format, which is a format of the third data of the relay apparatus, to generate second data described according to a second data format in which the physical quantity is described as a numerical value with a predetermined unit.

19. A data collection apparatus configured to collect data transmitted from a plurality of devices having a communication function,
the data collection apparatus comprising:
a receiver configured to receive data transmitted from the plurality of devices;

a data analyzer configured to acquire analyzed data by analyzing the received data according to an analysis data format which is different for each device of the plurality of devices, the analysis data format being predetermined for each type of device of the plurality of devices;

a first data storage which is a non-rewritable storage;

a second data storage which is storage that can be accessed faster than the first data storage and that stores a smaller amount of data than the first data storage; and a data writer configured to write and store the data received by the receiver with a tag attached thereto to the first data storage, and write and store the analyzed data acquired by the data analyzer with the tag attached thereto to the second data storage, the tag being identification information associated with an installation location of the device from which the data is received.

20. A data collection method of a data collection system comprising a plurality of devices having a communication function and a data collection apparatus configured to collect data transmitted from the plurality of devices, the data collection method comprising:

receiving data transmitted from the plurality of devices;

acquiring analyzed data by analyzing the received data according to an analysis data format which is different for each device of the plurality of devices, the analysis data format being predetermined for each type of device of the plurality of devices;

writing and storing the data with a tag attached thereto to a first data storage which is a non-rewritable storage, the tag being identification information associated with an installation location of the device from which the data is received; and writing and storing the analyzed data with the tag attached thereto to a second data storage which is storage that can be accessed faster than the first data storage and that stores a smaller amount of data than the first data storage.

* * * * *